Aug. 20, 1940.  E. B. GEORGE  2,212,417
COMBINED MOTOR AND PUMP
Filed Feb. 10, 1938
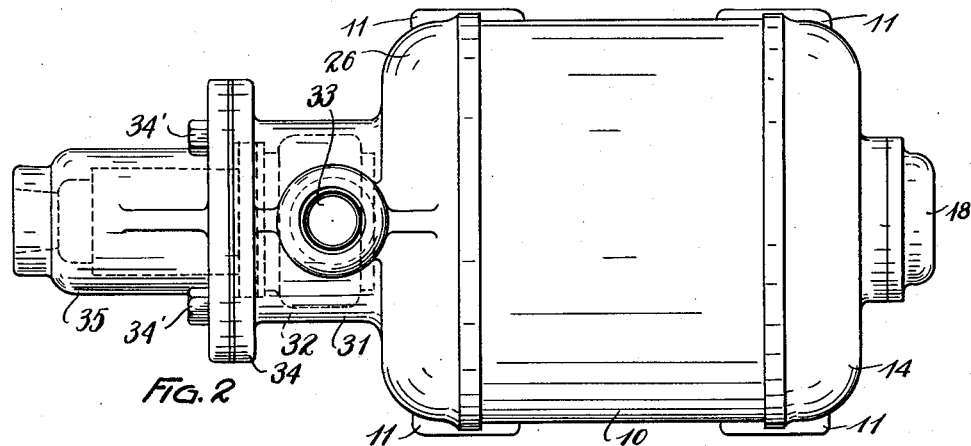
INVENTOR.
EARL B. GEORGE
BY
Kwis Hudson & Kent
ATTORNEYS Patented Aug. 20, 1940

2,212,417

UNITED STATES PATENT OFFICE 2,212,417

COMBINED MOTOR AND PUMP

Earl B. George, Dayton, Ohio, assignor to Robbins & Myers, Inc., Springfield, Ohio, a corporation of Ohio Application February 10, 1938, Serial No. 189,791

2 Claims. (Cl. 103—118)

This invention relates to a combined motor and rotary pump and has for one of its objects the provision of a close-coupled unitary structure that is adapted for low-cost-manufacture and that will, nevertheless, be efficient in operation and adapted for convenient installation and servicing. More particularly the invention relates to a unitary structure of minimum over-all length embodying a pump, of the type disclosed in the Moineau Patent 2,028,407, of January 21, 1936, and a motor, with the pump carried on the motor frame so that the pump will always be in proper alignment with the motor and the problem of installation will be greatly simplified.

Other objects of the invention and the features of novelty will be apparent from the following description, taken in connection with the accompanying drawing, of which Fig. 1 is a longitudinal section through a combined motor and pump, embodying my invention.

Fig. 2 is a plan view thereof, and

Fig. 3 is an elevation of the pump-end of the unit.

Referring to the drawing, 10 indicates the stator housing of an electric motor, having feet 11 thereon by which the motor may be secured to any suitable foundation or support. The stator laminations of the motor are indicated at 12, and the rotor at 13. Secured to one end of the housing 10 is the end bracket or bell 14 which is provided with an anti-friction bearing 15 in which one end of the shaft 16 of the motor is carried. The bearing 15 is preferably a ball bearing adapted to take end thrust in the shaft 16 and is mounted in a suitable counterbore 17, in the bracket 14, and held in position by a cap 18 and shoulder 19. The end portion of the shaft 16 is preferably reduced in diameter to form a shoulder 20, for the bearing 15, and the reduced portion of the shaft is threaded as indicated at 21 to receive the nut 22 by which the bearing 15 is secured to the shaft. Any suitable form of locking means, such as the washer 23, may be provided for preventing the nut 22 from loosening. The rotor 13 is secured to the shaft 16 in accordance with customary practice.

The shaft 16 is hollow and provided at one end with a fluid-tight plug 24, the other end of the shaft being supported in a bearing 25 in the end bracket or bell 26 that is secured to the housing 10. Exteriorly of the bearing 25 the hub 27 of the bracket 26 is recessed and provided with any suitable form of fluid-tight packing 28 or sealing means around the shaft to prevent the leakage of fluid along the shaft and to the interior of the motor. The packing 28 is retained in position by a ring 29 that may be secured by screws 30 or in any other suitable manner.

The bracket 26 is formed with an extension 31 which provides a chamber 32, and this chamber may serve as the discharge chamber of the pump and has an outlet 33. The extension 31 is formed with a flange 34 at its outer end and to this flange there is secured, by bolts 34', the pump housing 35 having the intake port 36. The stator of the pump is shown at 37 and the rotor at 38, these parts being shown as of the type disclosed in the aforesaid Moineau patent. The pump rotor 38 is hollow and provided, at the end adjacent the port 36, with a plug 39.

A quill or shaft 41 extends through the shaft 16 to a point adjacent the bearing 15 and is provided with a ball end 42 which is secured to the shaft 16 by means of a bolt or pin 43, the opening in the ball end 42, for the bolt or pin 43, being so shaped as to permit the shaft 41 to have limited universal movement. In a similar manner the opposite end of the shaft 41 is provided with a ball 44 which is connected with the pump rotor 38 by a pin 45 so that this end of the shaft 41 has a universal joint connection with the pump rotor. While I have indicated the connection between the shaft 41 and the rotor 38 as being located near the middle of the rotor it will be obvious that this connection may be at either end of the rotor or at any point between the ends and that the length of the longitudinal bore of the rotor will be determined by the extent to which the shaft 41 projects into the rotor.

In accordance with the constructional principles of the pump, as disclosed in said Moineau patent, the axis of the pump rotor 38 is slightly offset from the axis of the stator 37 so that the rotor, in operation, has a gyratory movement in the stator. The axis of the pump stator 37 is preferably in alignment with the axis of the motor and, since the ball end 42 of the shaft 41 is coaxial with the shaft 16 and the ball end 42 is coaxial with the axis of the pump rotor 38, it will be seen that the pump-end of the shaft 41 will have a gyratory movement and, for this reason, the connections between the shaft 41 and the pump rotor 38 and the shaft 16 are of the universal joint type.

From the foregoing description it will be seen that the electric motor will drive the pump rotor 38, by means of the shaft 41, and that by providing the central opening through the shaft 16, for the shaft 41, it is possible to connect the shaft 41 with the shaft 16 at a point that is adjacent to the end remote from the pump, and this reduces the angularity of the shaft 41, with respect to the motor axis, to a minimum with a close-coupling of the pump to the motor. It will be obvious that, while the construction illustrated gives a relatively low angularity to the shaft 41, the shaft 41 may be connected with the shaft 16 and the rotor 38 at any other points therealong and although, by bringing these points of connection closer together, the angularity of the shaft 41 will be increased, this is perfectly feasible by using any of the common types of universal joints that are adapted for such service. These constructional features also permit the pump to be mounted directly on the end bracket 26 of the motor so that special supports for the pump are not required and a unitary structure is provided which may be conveniently secured to any suitable foundation by simply securing the motor in place.

The invention has the further advantage of making the working parts of the motor and of the pump readily accessible because, by removing the end bracket 14 of the motor, the motor shaft and rotor may be conveniently removed and, as will be obvious, the pump housing 35 may be conveniently disconnected from the flange 34 so as to afford ready access to the working parts of the pump.

While I have illustrated and described an embodiment of the invention that is especially adapted for horizontal mounting, this construction is also adapted for vertical mounting by securing the feet 11 of the motor to a side wall bracket, or by using any of the common methods of supporting vertical motors. While I have illustrated a combined electric motor and pump construction it is not intended thereby to limit the invention to electric motors as the principles of the invention are equally applicable to other motors, such as internal combustion and fluid pressure motors.

Having thus described my invention, I claim:

1. In a combined motor and rotary pump, the combination of a housing comprising a pump stator and provided with inlet and discharge chambers, a motor stator within said housing, a hollow shaft rotatably supported in said housing for rotation about a fixed axis, a motor rotor carried by said hollow shaft, a gyratory pump rotor within said pump stator, said pump rotor being offset axially with respect to said hollow shaft, a second shaft at least a portion of which is within said hollow shaft and free to gyrate therein, and means for connecting said second shaft with said pump rotor and with said hollow shaft adjacent to the end thereof remote from said pump rotor.

2. A combined motor and rotary pump comprising a motor frame, end brackets on said frame, a hollow shaft rotatably mounted in said brackets, a motor rotor on said hollow shaft, one of said brackets having a fluid chamber therein, sealing means for preventing fluid from flowing from said chamber into said motor, a pump stator carried by the last-mentioned of said brackets, a gyratory pump rotor within said pump stator and in axial spaced relation to said hollow shaft, a second shaft one end of which extends into said hollow shaft and a portion of which is free to gyrate therein, and universal driving connections for connecting said second shaft with said pump rotor and with said hollow shaft adjacent to the end of the hollow shaft remote from said pump rotor.

EARL B. GEORGE.